US012689446B2

(12) United States Patent (10) Patent No.: US 12,689,446 B2

DiAdamo et al. (45) Date of Patent: Jul. 21, 2026

(54) CHANNEL CODING OVER QUANTUM CHANNELS

(71) Applicant: Cisco Technology, Inc., San Jose, CA (US)

(72) Inventors: Stephen Magno DiAdamo, Munich (DE); Lakshika Rathi, Jodhpur (IN); Alireza Shabani, Los Angeles, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 229 days.

(21) Appl. No.: 18/466,889

(22) Filed: Sep. 14, 2023

(65) Prior Publication Data

US 2025/0096906 A1 Mar. 20, 2025

(51) Int. Cl.
H04B 10/70 (2013.01)
G06N 10/60 (2022.01)

(52) U.S. Cl.
CPC ............. H04B 10/70 (2013.01); G06N 10/60 (2022.01)

(58) Field of Classification Search
CPC ................................ H04B 10/70; G06N 10/60
USPC .......................................................... 398/40
See application file for complete search history.

(56) References Cited

U.S. PATENT DOCUMENTS

| | | | | |
|---|---|---|---|---|
| 10,552,738 B2 * | 2/2020 | Holt | .......................... | G06N 3/084 |
| 10,552,739 B1 * | 2/2020 | Rausch | ............... | H04L 67/1097 |

| | | | | |
|---|---|---|---|---|
| 2018/0174050 A1 * | 6/2018 | Holt | ........................ | G06N 3/084 |
| 2018/0322388 A1 * | 11/2018 | O'Shea | .................. | H04L 1/0001 |
| 2019/0188565 A1 * | 6/2019 | O'Shea | .................... | G06N 3/08 |
| 2020/0274554 A1 | 8/2020 | Aspuru-Guzik et al. | | |
| 2021/0383189 A1 | 12/2021 | Cong et al. | | |
| 2022/0263694 A1 * | 8/2022 | Iscan | ................. | H04L 25/03929 |
| 2023/0110591 A1 | 4/2023 | Routt et al. | | |
| 2023/0123083 A1 | 4/2023 | Huangfu et al. | | |
| 2025/0096906 A1 * | 3/2025 | DiAdamo | .............. | G06N 20/00 |
| 2025/0148343 A1 * | 5/2025 | Villalonga Correa | ....................... G06N 10/40 | |

FOREIGN PATENT DOCUMENTS

| | | | | | |
|---|---|---|---|---|---|
| CN | 108809436 A | * | 11/2018 | ........... | H04L 9/0825 |
| CN | 115580355 A | | 1/2023 | | |
| WO | WO-2023287487 A2 | * | 1/2023 | ........... | H04B 10/615 |

(Continued)

OTHER PUBLICATIONS

Rathi et al; Quantum Autoencoders for Learning Quantum Channel Codes ;Jul. 2023, aRxiv; pp. 1-6. (Year: 2023).*

(Continued)

*Primary Examiner* — Amritbir K Sandhu

(74) *Attorney, Agent, or Firm* — Edell, Shapiro & Finnan, LLC

(57) ABSTRACT

A method of managing communication over a quantum channel. The method includes generating a first set of quantum channel codes configured to encode a message to obtain a quantum encoded message, supplying the first set of quantum channel codes to an encoder, generating a second set of quantum channel codes configured to decode the quantum encoded message, and supplying the second set of quantum channel codes to a decoder that is configured to operate with encoder across a channel, wherein the first set of quantum channel codes and the second set of quantum channel codes are derived using a machine learning model.

20 Claims, 13 Drawing Sheets

(56)                References Cited

FOREIGN PATENT DOCUMENTS

WO      WO-2023128603 A1 *   7/2023    ............. G06N 10/40
WO      WO-2023230352 A1 *  11/2023    ............. G06N 10/70

OTHER PUBLICATIONS

Monnet et al; Pooling techniques in hybrid quantum-classical convolutional neural networks—May 2023; IEEE, pp. 1-10 (Year: 2023).*

Khatri, S., et al., "Information-theoretic aspects of the generalized amplitude damping channel," arXiv: 1903.07747v2 [quant-ph], Jul. 10, 2020, 33 pages.

James, R. G., et al., "dit: a Phython package for discrete information theory," The Journal of Open Source Software, DOI: 10.21105/joss. 00738, May 31, 2018, 3 pages, https:// doi.org/10.21105/joss.00738.

Banaszek, K., et al., "Quantum Limits in Optical Communications," Journal of Lightwave Technology, vol. 38, No. 10, DOI: 10.1109, May 15, 2020, 14 pages.

Bergholm, V., et al., "PennyLane: Automatic differentiation of hybrid quantum-classical computations," https://arxiv.org/abs/1811. 04968, Jul. 29, 2022, 18 pages.

Bondarenko, D., et al., "Quantum autoencoders to denoise quantum data," https://arxiv.org/abs/1910.09169, Oct. 21, 2019, 8 pages.

Cerezo, M., et al., "Variational quantum algorithms," https://arxiv. org/abs/2012.09265, Oct. 4, 2021, 33 pages.

Devetak, I., et al., "The capacity of a quantum channel for simultaneous transmission of classical and quantum information," https:// arxiv.org/abs/quant-ph/0311131, Oct. 21, 2004, 17 pages.

Frostig, R., et al., "Compiling machine learning programs via high-level tracing," Systems for Machine Learning, https://mlsys. org/Conferences/doc/2018/146.pdf, Feb. 2018, 3 pages.

Guha, S., "Structured optical receivers to attain super additive capacity and the Holevo limit," https://arxiv.org/abs/1101.1550v1, Jan. 7, 2011, 4 pages.

Holevo, A. S., "The Capacity of the Quantum Channel with General Signal States," IEEE Transactions on Information Theory, Correspondence, IEEE Xplore, vol. 44, No. 1, Jan. 1998, 5 pages.

Huang, C-J., et al., "Realization of a quantum autoencoder for lossless compression of quantum data," https://arxiv.org/abs/1903. 08699v3, Apr. 7, 2020, 15 pages.

Jiang, Y., et al., "Turbo Autoencoder: Deep learning based channel codes for point-to-point communication channels," 33rd Conference on Neural Information Processing Systems, NeurIPS 2019, Vancouver, Canada, Dec. 2019, 11 pages.

Letizia, N. A., et al., "Capacity-Driven Autoencoders for Communications," IEEE Open Journal of the Communications Society, vol. 2, https://ieeexplore.ieee.org/abstract/document/9449919, Jun. 18, 2021, 13 pages.

Liang, X-T., et al., "Entanglement-Assisted Classical Capacities of Some Single Qubit Quantum Noisy Channels," Modern Physics Letters B, vol. 16, No. 12, World Scientific Publishing Company, May 2002, 8 pages.

Liu, L., et al., "On the Variance of the Adaptive Learning Rate and Beyond," Published as a conference paper at ICLR 2020, https:// arxiv.org/abs/1908.03265, Oct. 26, 2021, 14 pages.

Monnet, M., et al., "Pooling techniques in hybrid quantum-classical convolutional neural networks," https://arxiv.org/abs/2305.05603, May 9, 2023, 10 pages.

Ngairangbam, V.S., et al., "Anomaly detection in high-energy physics using a quantum autoencoder," American Physical Society, Physical Review D 105, 095004, https://journals.aps.org/prd/abstract/ 10.1103/PhysRevD.105.095004, May 2022, 15 pages.

O'Shea, T., et al., "An Introduction to Deep Learning for the Physical Layer," IEEE Transactions on Cognitive Communications and Networking, vol. 3, No. 4, https://ieeexplore.ieee.org/abstract/ document/8054694, Dec. 2017, 13 pages.

Qin, Z., et al., "Deep Learning in Physical Layer Communications," IEEE Wireless Communications, vol. 26, No. 2, https://ieeexplore. ieee.org/abstract/document/8663966, Apr. 2019, 7 pages.

Romero, J., et al., "Quantum autoencoders for efficient compression of quantum data," https://arxiv.org/abs/1612.02806, Feb. 10, 2017, 10 pages.

Shannon, C.E., "A Mathematical Theory of Communication," The Bell System Technical Journal, vol. 27, No. 3, https://ieeexplore. ieee.org/document/6773024, Jul. 1948, 55 pages.

Tian, J., et al., "Recent Advances for Quantum Neural Networks in Generative Learning," https://arxiv.org/abs/2206.03066, Jun. 7, 2022, 30 pages.

Wilde, M. M., "From Classical to Quantum Shannon Theory," Cambridge University Press, https://arxiv.org/abs/1106.1445, Jul. 14, 2019, 774 pages.

Zhu, Y., et al., "Quantum autoencoders for communication-efficient quantum cloud computing," https://arxiv.org/abs/2112.12369, Dec. 23, 2021, 14 pages.

* cited by examiner

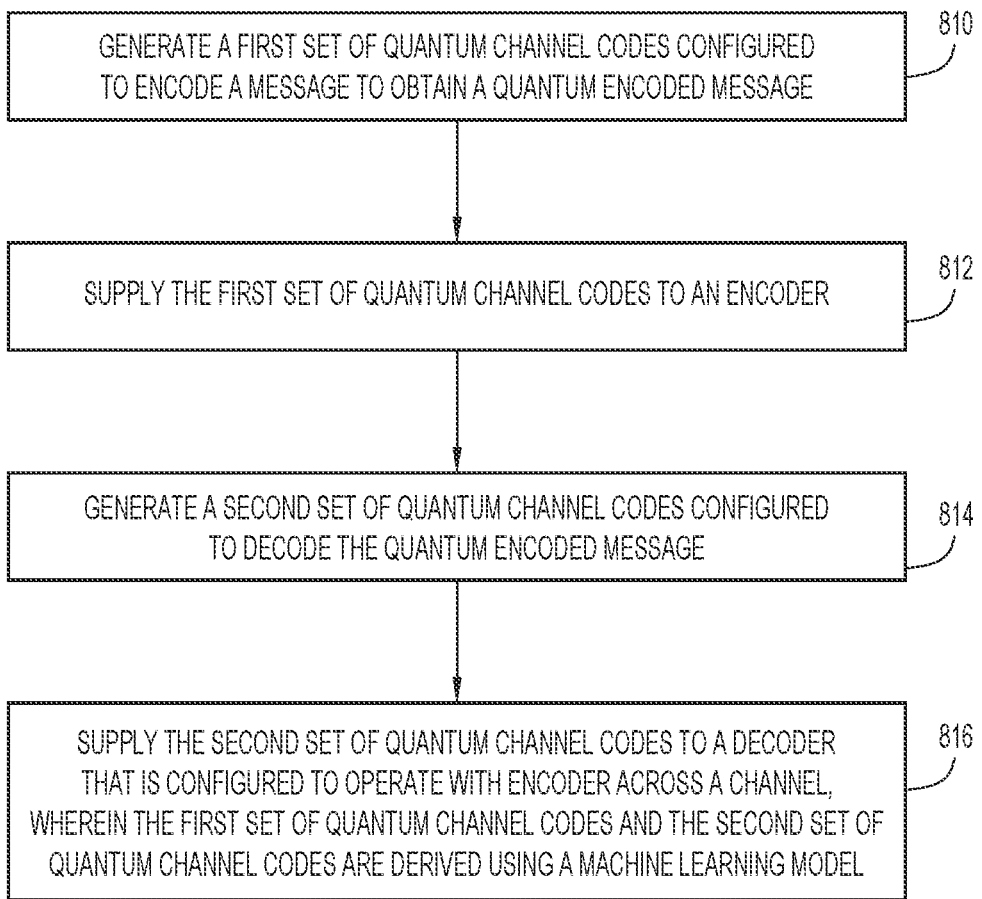

GENERATE A FIRST SET OF QUANTUM CHANNEL CODES CONFIGURED TO ENCODE A MESSAGE TO OBTAIN A QUANTUM ENCODED MESSAGE — 810

SUPPLY THE FIRST SET OF QUANTUM CHANNEL CODES TO AN ENCODER — 812

GENERATE A SECOND SET OF QUANTUM CHANNEL CODES CONFIGURED TO DECODE THE QUANTUM ENCODED MESSAGE — 814

SUPPLY THE SECOND SET OF QUANTUM CHANNEL CODES TO A DECODER THAT IS CONFIGURED TO OPERATE WITH ENCODER ACROSS A CHANNEL, WHEREIN THE FIRST SET OF QUANTUM CHANNEL CODES AND THE SECOND SET OF QUANTUM CHANNEL CODES ARE DERIVED USING A MACHINE LEARNING MODEL — 816

CHANNEL CODING OVER QUANTUM CHANNELS

TECHNICAL FIELD

The present disclosure relates to data communication, and more particularly to channel coding over a quantum channel.

BACKGROUND

Machine learning (ML) has emerged as a powerful tool for generating communication codes that achieve channel capacity in various channel models. Promising results in communication theory using ML have been demonstrated. Specifically, an autoencoder, a type of neural network, has been proposed as an alternative model for classic communication systems. An autoencoder model may be arranged by mapping the layers of the neural network to an encoder, a noisy channel, and a decoder.

Quantum autoencoder models have also found rapid adoption in diverse research fields, including quantum computing, energy physics, data compression, and quantum communication. In these contexts, quantum autoencoders are inspired by variational algorithms that iteratively update parameters to learn how to compress and decompress the Hilbert spaces that encompass the quantum systems.

BRIEF DESCRIPTION OF THE DRAWINGS

FIG. 8 is a flowchart illustrating a series of operations executed by image sensitivity detection and control logic, according to an example embodiment.

DETAILED DESCRIPTION

Overview

A method of managing communication over a quantum channel. The method includes generating a first set of quantum channel codes configured to encode a message to obtain a quantum encoded message, supplying the first set of quantum channel codes to an encoder, generating a second set of quantum channel codes configured to decode the quantum encoded message, and supplying the second set of quantum channel codes to a decoder that is configured to operate with the encoder across a channel, wherein the first set of quantum channel codes and the second set of quantum channel codes are derived using a machine learning model.

In another embodiment, a device is provided. The device includes an interface configured to enable network communications, a memory, and one or more processors coupled to the interface and the memory, and configured to generate a first set of quantum channel codes configured to encode a message to obtain a quantum encoded message, supply the first set of quantum channel codes to an encoder, generate a second set of quantum channel codes configured to decode the quantum encoded message, and supply the second set of quantum channel codes to a decoder that is configured to operate with the encoder across a channel, wherein the first set of quantum channel codes and the second set of quantum channel codes are derived using a machine learning model.

Example Embodiments

In information theory, channel capacity theorems are often proven non-constructively, leaving the challenging task of determining a capacity-achieving code open-ended. This holds true for quantum communication as well, where, for example, the Holevo capacity outperforms classical capacity for certain channels, but joint-detection receivers (JDRs), which may be relatively easy to produce, are still a challenging problem.

Disclosed herein, and in accordance with example embodiments, is an approach to leverage quantum autoencoders to find easier-to-build JDRs that can allow for higher communication rates approaching theoretical limits.

In a classical setting, autoencoders are used to generate channel codes over noisy classical channels. Described herein is a framework for analyzing quantum channel codes and is a framework to benchmark learned-code performance for various channels. Two main areas are discussed: 1) Classical-quantum channel coding and 2) incorporating shared entanglement resources to the model for entanglement-assisted (EA) communication. The models employed show efficient learning encoding and decoding of parameters that enable the systems to approach theoretical capacities in these cases.

Channel Coding with Quantum Machine Learning

Figure 1:
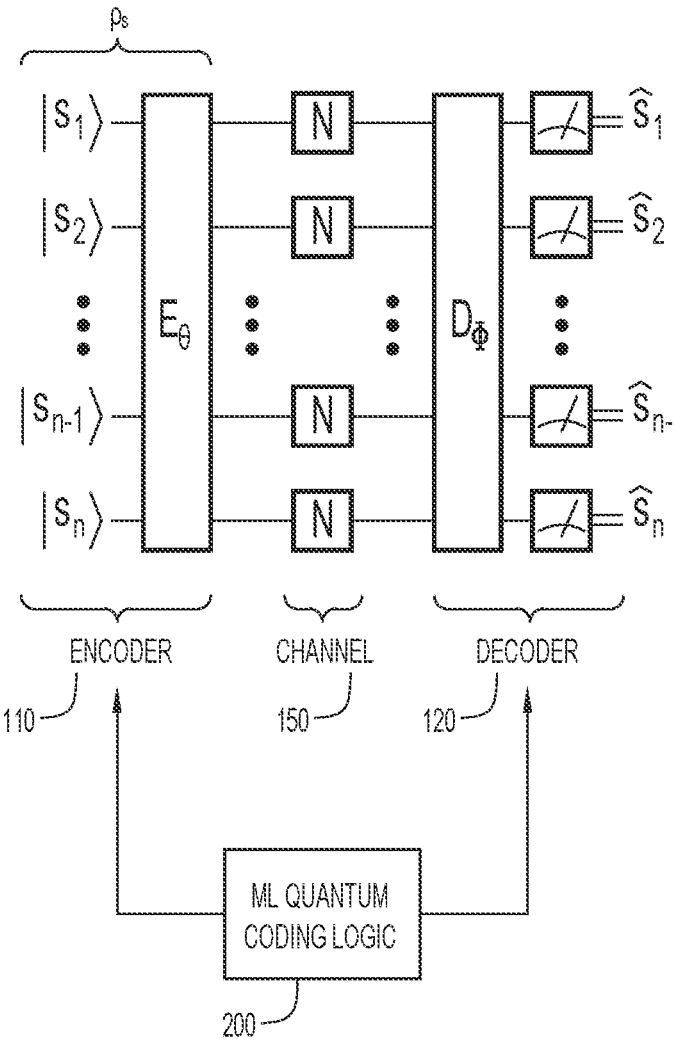
FIG. 1 illustrates an encoder, a decoder, and a channel therebetween, along with machine learning (ML) quantum coding logic, according to an example embodiment.

The performance of parameterized circuits in learning classical and EA capacities for various channels is described below. More specifically, FIG. 1 illustrates an encoder 110, a decoder 120 and channel N 150 therebetween, along with machine learning (ML) quantum coding logic 200, according to an example embodiment. The communication process is as follows: a sender chooses a classical message from a codebook s∈M (s$_1$, s$_2$, etc.), which is then encoded using encoder 110 into a quantum state $\rho_s$ using a unitary parameterized operation $E_\theta$. $\rho_s$ is the input state operated on by $E_\theta$. The parameterized operation Ee has a particular circuit structure, and a k-length vector $\theta \in R^k$ defines the operations. The encoded state $\rho_s$ is transmitted through channel N 150, e.g., a completely positive, trace-preserving map. The resulting state $N(E_\theta(\rho_s))$ is processed by decoder 120 $D_\phi$, which is parameterized by $\phi \in R^{k'}$, where k' can be different from k. The measurement of the state yields a classical message ŝ approximating s and defines a conditional distribution $\rho(\hat{s}|s)$. As noted, this framework is illustrated in FIG. 1 along with Machine Learning (ML) quantum coding logic 200, which is configured to provide the parameterization codes to encoder 110 and decoder 120. In the case of FIG. 1, a JDR, which is a type of measurement device that converts a quantum signal to a classical measurement, would be the combination of the decoder plus the measurements, e.g., implemented as part of decoder 120.

Figure 2:
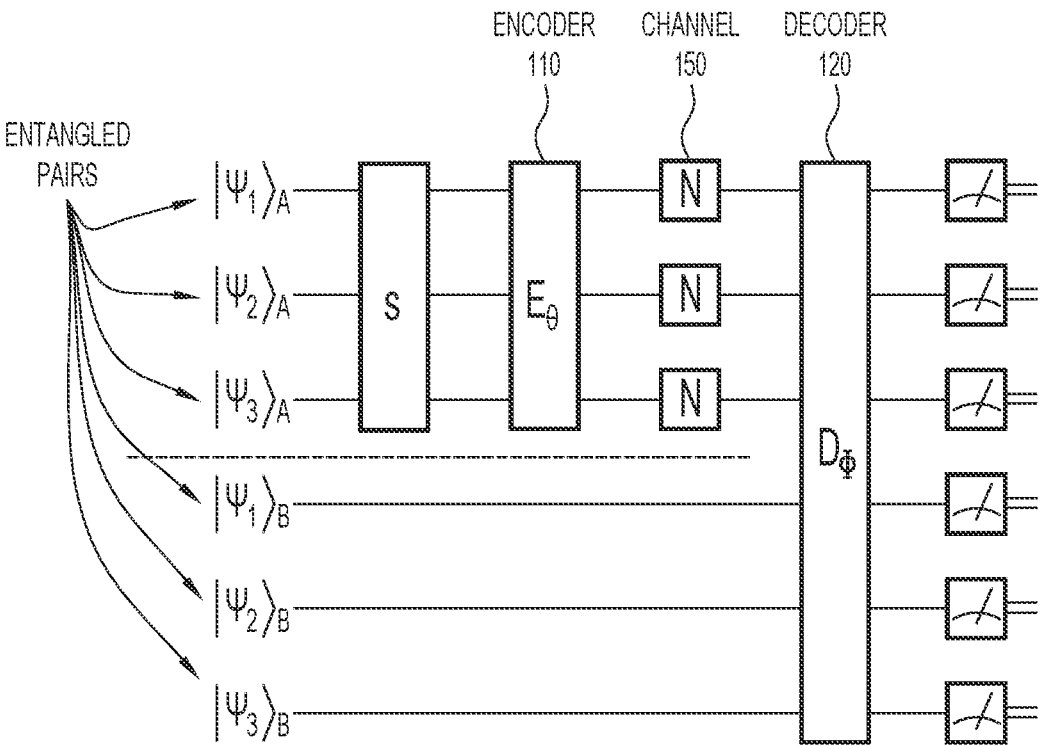
FIG. 2 illustrates entangled-assisted communication that may be employed in connection with ML quantum coding logic, according to an example embodiment.
Figure 3:
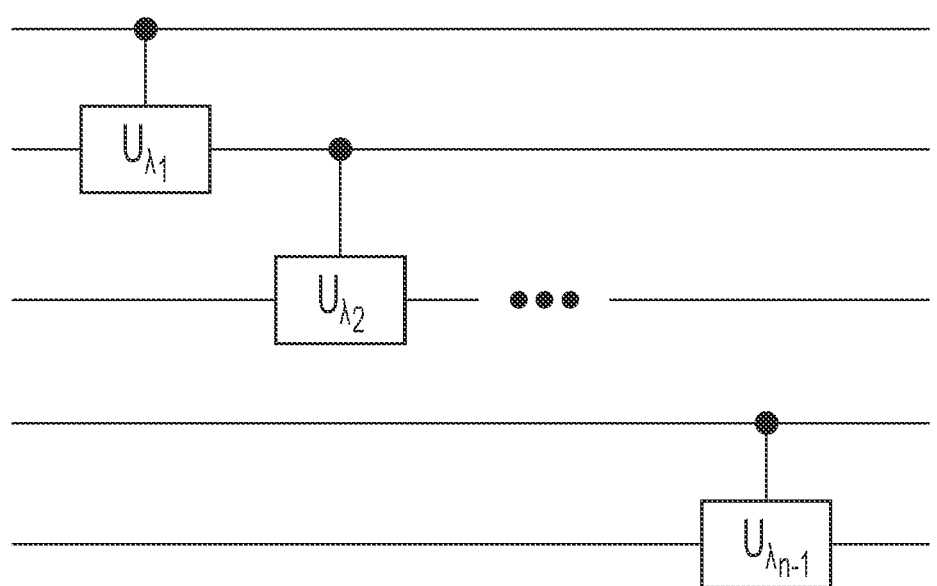
FIG. 3 is an example of a parameterized information-pooling circuit that may be employed in connection with quantum channel coding, according to an example embodiment.

FIG. 2 illustrates entanglement-assisted (EA) communication that may be employed in connection with ML quantum coding logic 200, according to an example embodiment. FIG. 2 is an extension of FIG. 1. For EA capacities, additional qubits are introduced to the system. Pairs of qubits are firstly entangled using parameterized entangling operations, then half of them experience channel noise and half do not, as illustrated in FIG. 2. The receiver (decoder 120) then uses the total system for message decoding. In some cases, redundant qubits are introduced for repetition codes, for example. In these cases, a parameterized "pooling" circuit (as shown in FIG. 3) is incorporated in decoder 120, i.e., placed between Do and the measurements. The pooling circuit is a parameterized circuit with an independent set of parameters $U_{\lambda 1}$, $U_{\lambda 2}$, $U_{\lambda n-1}$. To analyze the quality of the learned channel code, ML quantum coding logic 200 calculates the respective mutual information using input-output values over the channel and compares it to the known channel capacities.

In accordance with one experiment, the framework is set up for learning quantum channel codes, and then learned codes were analyzed for different channels. The channels may be set up as described in, e.g., M. M. Wilde, Quantum Information Theory, Cambridge University Press, 2013 and S. Khatri, K. Sharma, and M. M. Wilde, "Information-theoretic aspects of the generalized amplitude-damping channel," Physical Review A, vol. 102, no. 1, p. 012401, 2020.

In a particular implementation, the framework used involves the JAX interface (R. Frostig, M. J. Johnson, and C. Leary, "Compiling machine learning programs via high-level tracing," Systems for Machine Learning, vol. 4, no. 9, 2018) with the Pennylane software library (V. Bergholm, J. Izaac, M. Schuld, C. Gogolin, S. Ahmed, V. Ajith, M. S. Alam, G. Alonso-Linaje, B. Akash Narayanan, A. Asadi et al., "Pennylane: Automatic differentiation of hybrid quantum-classical computations," arXiv preprint arXiv: 1811.04968, 2018) for quantum simulation and a variant of the Adam optimizer (L. Liu, H. Jiang, P. He, W. Chen, X. Liu, J. Gao, and J. Han, "On the variance of the adaptive learning rate and beyond," CoRR, abs/1908.03265, 2019) for parameter updating. As a cost function, the approach uses the average cross-entropy loss since message decoding is a classification task. In each case, a general circuit model is used such that each logic gate used is an arbitrary rotation parameterized by three parameters, each parameter learned during the training process. For training, on the order of 100s of epochs were used with 10s of batches taken from 1,000s of samples using a learning rate of 10-2. Once the model is trained for a specific channel, a set of test messages is used to compute the mutual information for the code using the discrete information theory (DIT) Python library as an aid.

Figure 4:
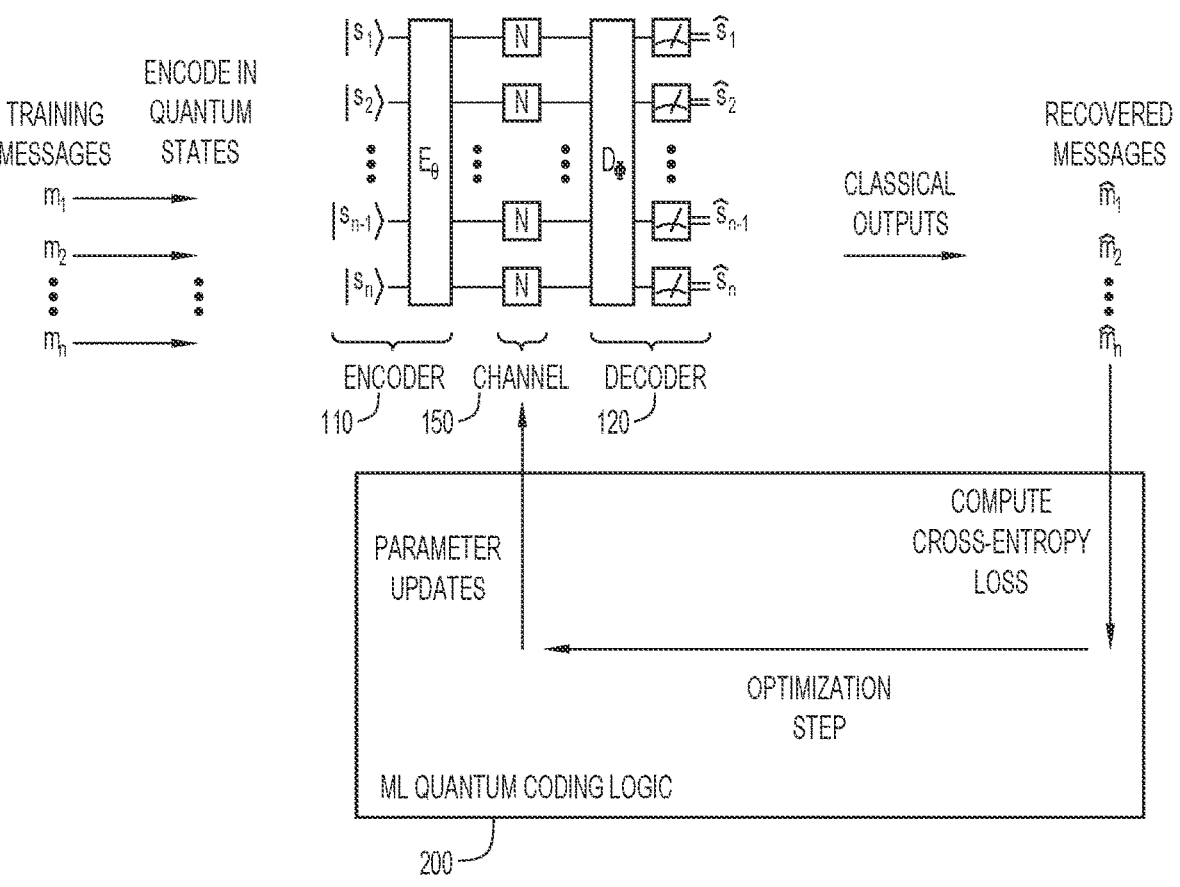
FIG. 4 illustrates ML quantum coding logic in a training mode and performing parameter updates for the encoder and the decoder, according to an example embodiment.

FIG. 4 illustrates ML quantum coding logic 200 operating in a training mode and performing parameter updates for encoder 110 and decoder 120, according to an example embodiment. That is, training messages $m_1$, $m_2$, . . . $m_n$, are encoded into their quantum states $s_1$, $s_2$, . . . $s_n$. Those encoded states are parameterized via encoder 110, and transmitted over channel N 150 whereupon they are decoded by decoder 120 with parameters derived by and provided by ML quantum coding logic 200, to obtain classical outputs $\hat{s}_1$, $\hat{s}_2$, . . . , $\hat{s}_n$. These classical outputs are then converted to the recovered messages $\hat{m}_1$, $\hat{m}_2$, . . . , $\hat{m}_n$. The cross-entropy loss is then computed, the result of which feeds an optimization step, to generate parameter updates, which are then supplied to encoder 110 and decoder 120.

More specifically, the following operations may be executed in connection with training:

1) Select initial values for theta, phi, and lambda (when used in a pooling circuit).
2) Simulate the parameterized quantum circuit for a particular number of samples to generate an output statistic. Simulating the quantum circuit relies on qubit simulation and modeling the noise effects of the channel.
3) Using the statistics, ML quantum coding logic 200 reconstructs the input message and then computes a loss function.
4) The loss function may be the cross-entropy loss, but this can be generalized for particular communication problems. For example, additional pieces can be added to the loss function to ensure capacity is maximized.
5) The optimization operation relies on the quantum circuit being "differentiable" so that gradient descent can be applied to optimize the parameters. This may not always be the case, and a technique called the "parameter shift rule" may be applied.
6) Once the parameters are updated, they are sent back to the quantum circuit simulation.

Classical Communication

Figure 5A:
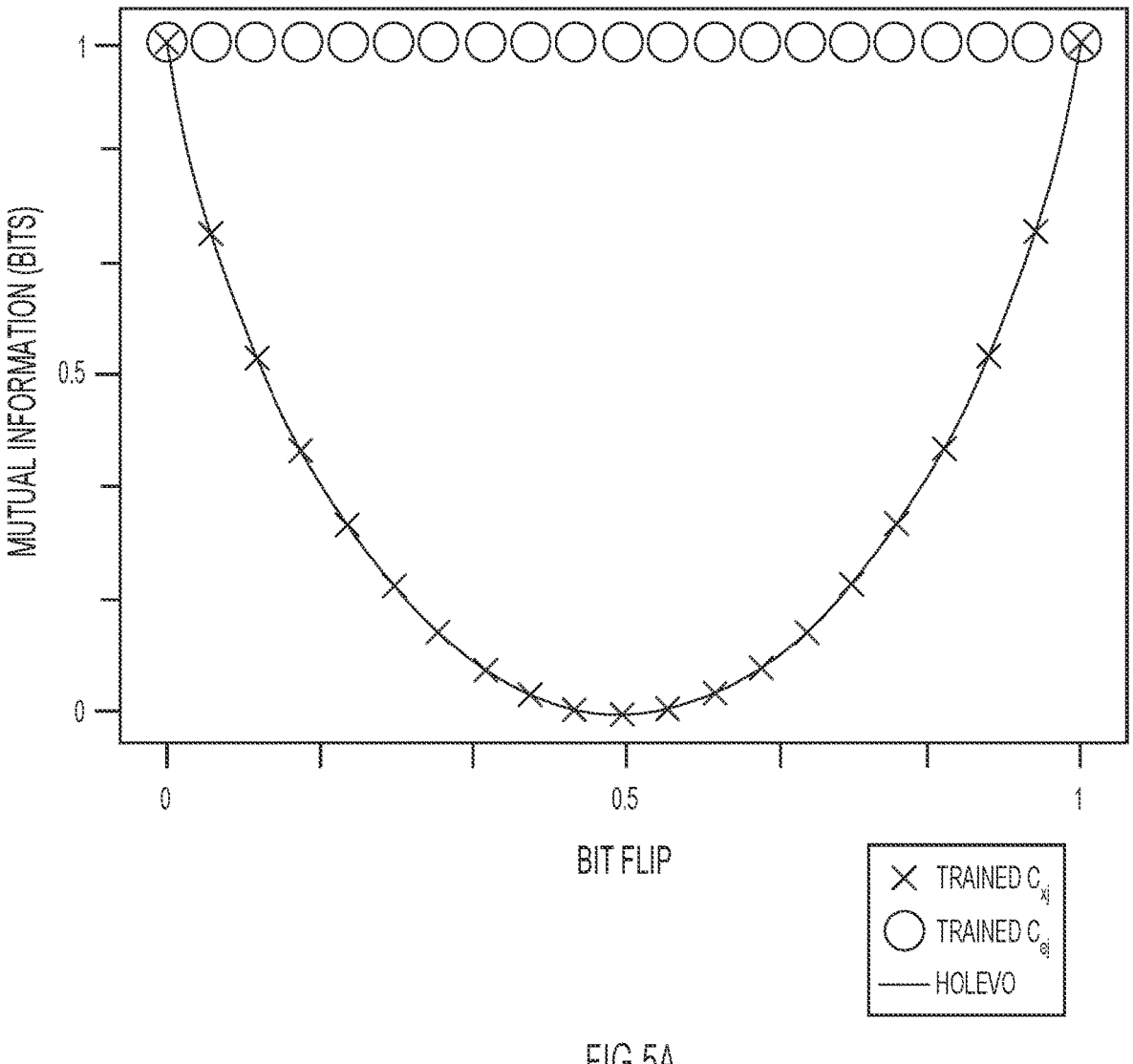
FIGS. 5A, 5B, and 5C show, respectively, performance results for a bit-flip channel, a depolarizing channel, and a p=1 amplitude damping channel, according to an example embodiment.
Figure 5B:
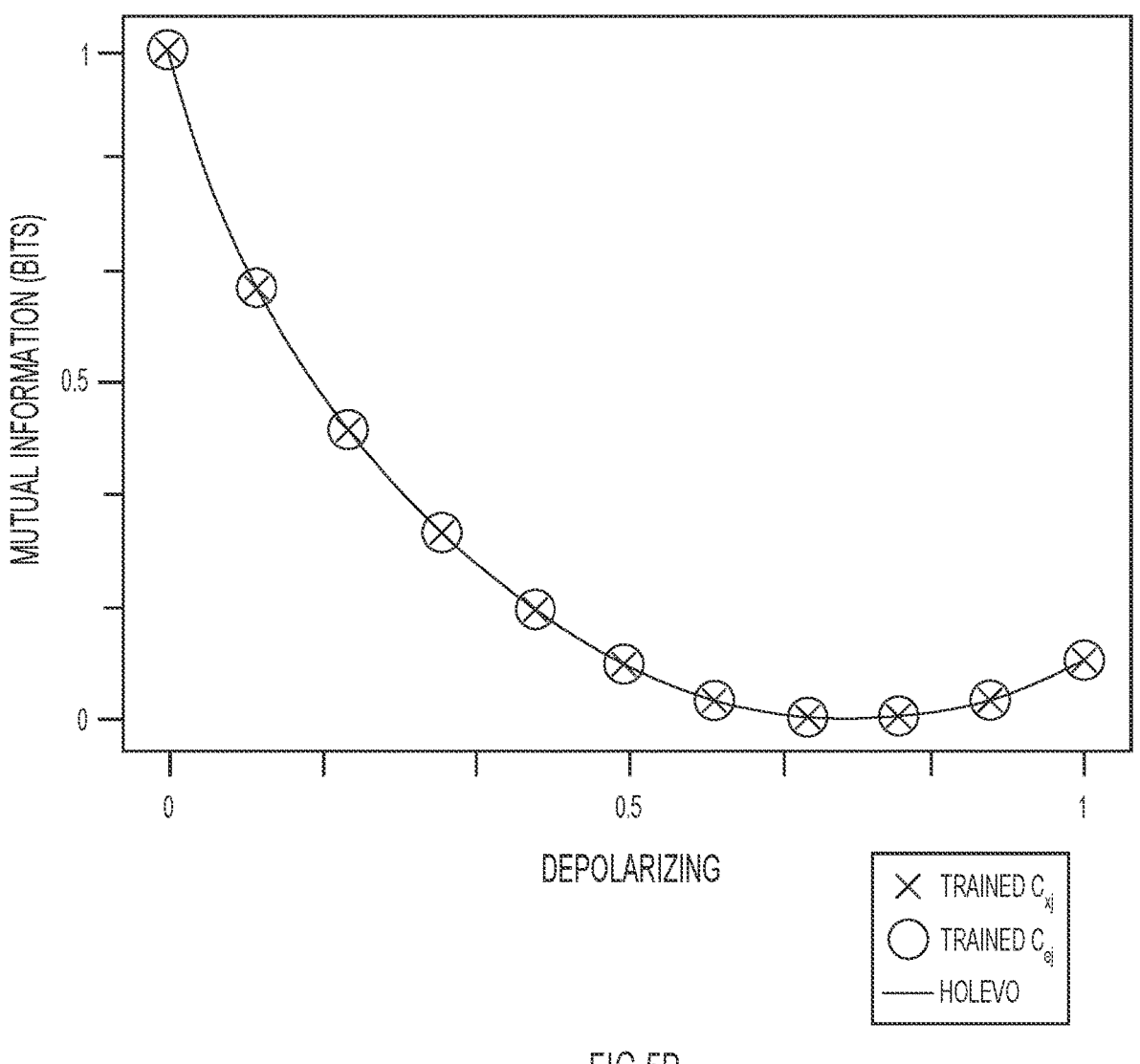
Figure 5C:
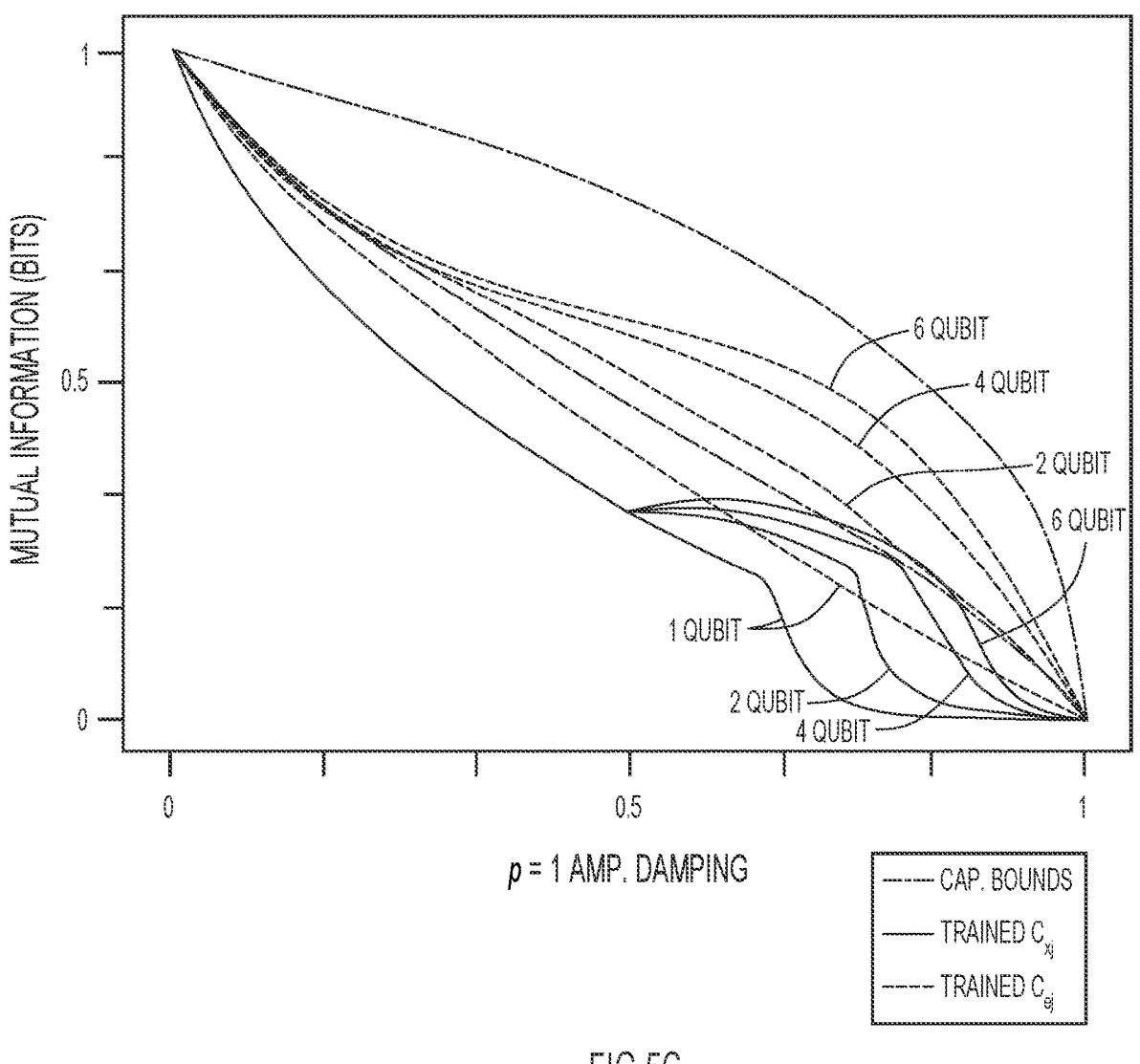

Classical communication over quantum channels can be executed in a variety of ways and therefore there are four main capacities to consider when no additional entanglement resources are used: 1) Separable-state encoding and decoding $C_{ss}$, 2) Separable-state encoding and joint measurement decoding $C_{sj}$, also known as the Holevo capacity, 3) Entangled-state encoding and separable measurement decoding $C_{es}$, and 4) Entangled-state encoding and joint decoding $C_{ej}$. Depending on the desired model, the framework of the present embodiments allows testing of, or operations for, any of these cases. In one implementation, various code models were tested for channels that behave as (a) Bit-flip channel, (b) Depolarizing channel, and (c) p=1 amplitude damping channel. The results of training the code are shown in FIGS. 5A, 5B, and 5C, respectively.

For the bit-flip (FIG. 5A) and depolarizing (FIG. 5B) channel, the framework was able to produce circuit parameters that produce a code that meets the channel capacity. Note that for the p=1 amplitude damping channel (FIG. 5C), a non-unital channel, the Holevo quantity is a lower bound to the capacity. The output of the framework, though, produced sub-optimal parameters to approach the capacity lower bound for the single qubit case. When repetition codes with pooling are used, it can be seen that when six qubits are used in the repetition, the lower bound is exceeded for some y values. A communication rate improvement is seen again using repetition codes when encoding is used, as shown by the dashed lines.

Entanglement-Assisted Classical Communication

Figure 6A:
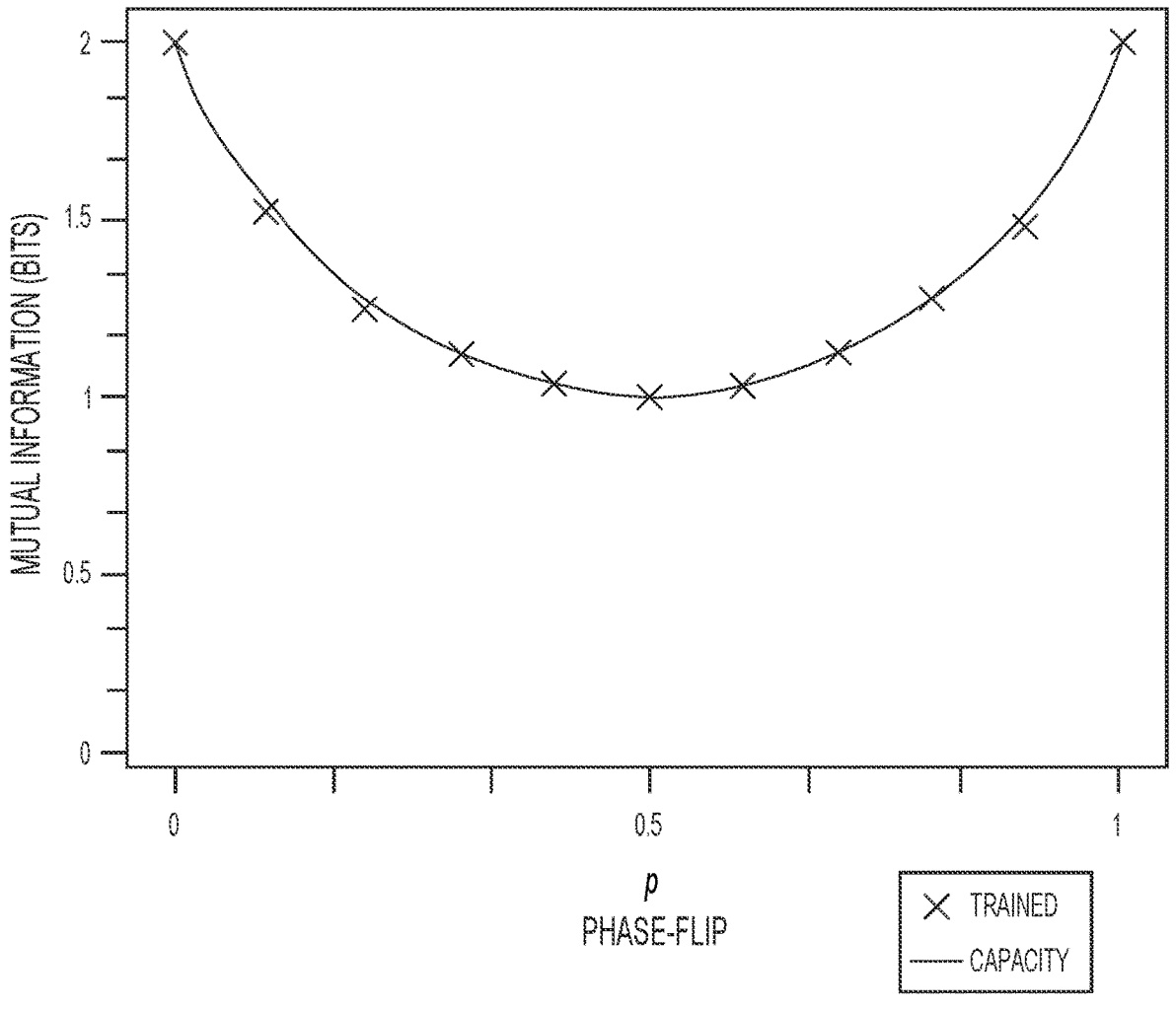
FIGS. 6A, 6B, and 6C show, respectively, performance results for EA capacity for a phase-flip channel, a depolarizing channel, and a p=½ amplitude damping channel.
Figure 6B:
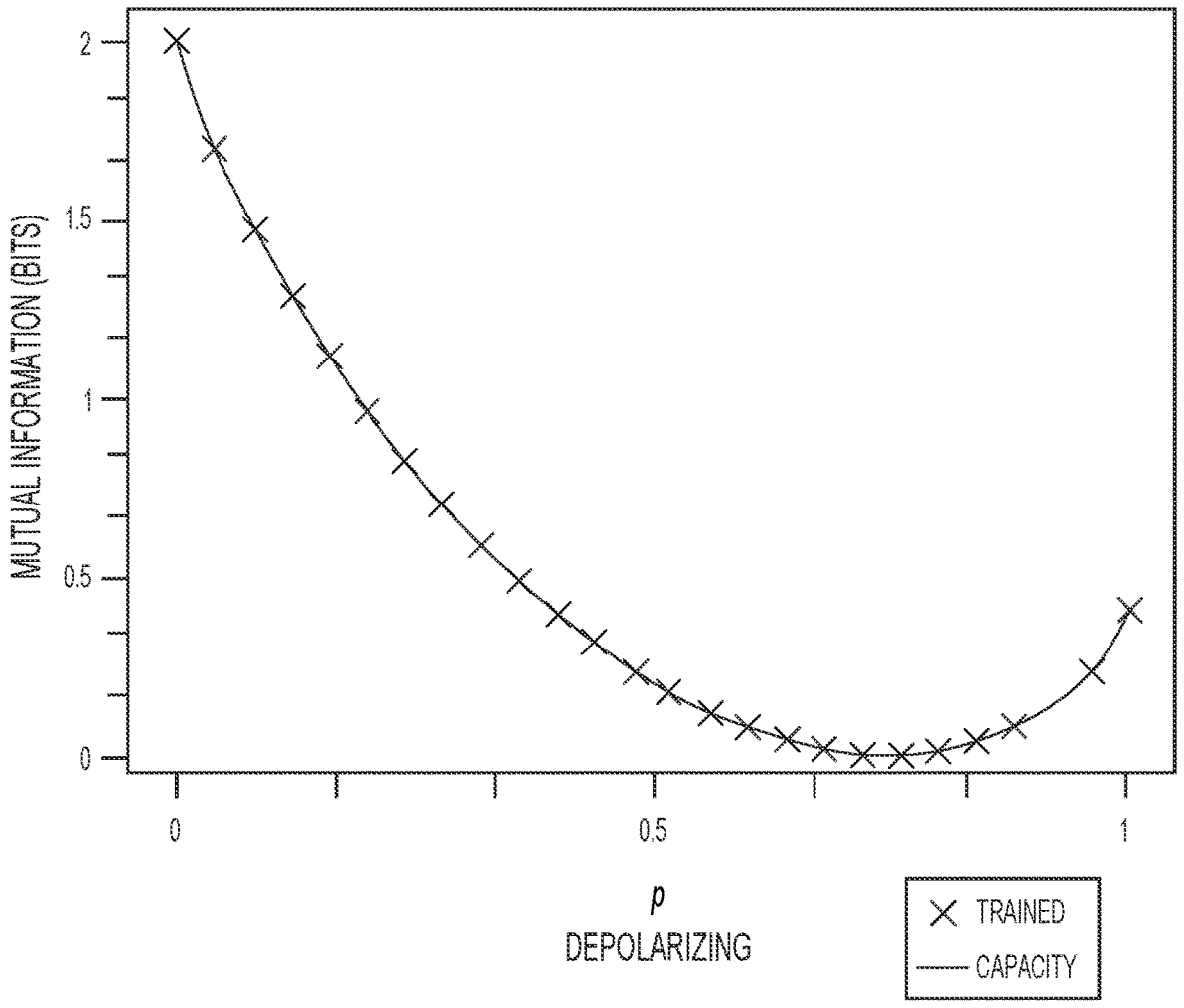
Figure 6C:
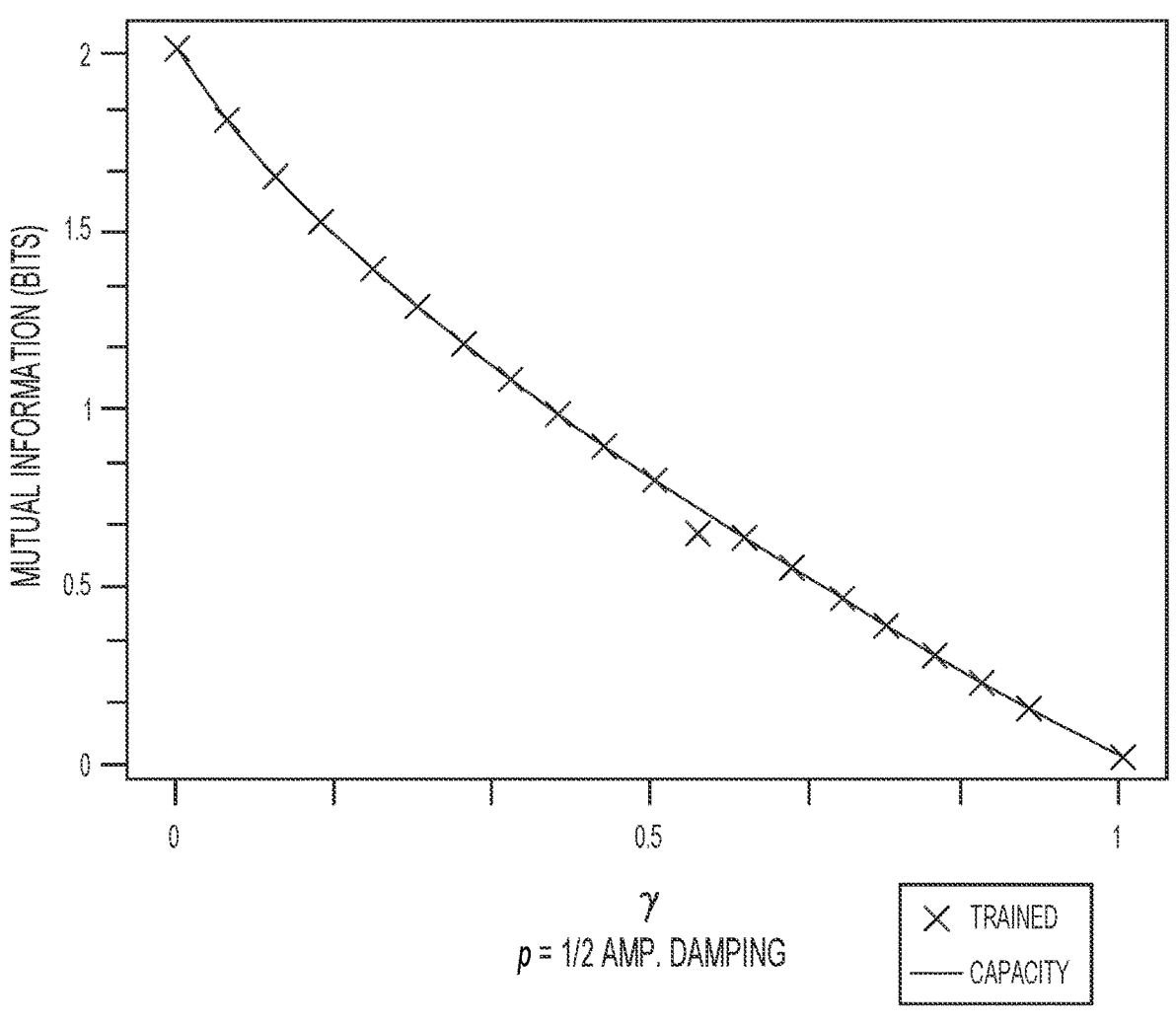

The model for point-to-point EA communication is that two communicating parties, before communication takes place, share unlimited maximally entangled states, as previously shown in FIG. 2. When communication starts, the sender encodes information on their share of the entanglement and transmits the state over the noisy quantum channel. The receiver, upon arrival, decodes the total state. The EA capacity was analyzed for three channels that behave as: phase-flip (FIG. 6A), depolarizing (FIG. 6B), and (f) p=½ amplitude damping (FIG. 6C). The results shown in FIGS. 6A-6C show that the framework is able to train the parameterized circuit model to find the parameters that nearly meet or meet the channel capacity in each case. The known capacity of each channel is reached using super-dense coding in these cases, which the trained model was able to reproduce.

The Kraus operations modeling the behavior of the several channel types are the following:

Bit–flip:

$$K_0 = \sqrt{1-p}\begin{bmatrix} 1 & 0 \\ 0 & 1 \end{bmatrix}, K_1 = \sqrt{p}\begin{bmatrix} 0 & 1 \\ 1 & 0 \end{bmatrix}$$

Phase–flip:

$$K_0 = \sqrt{1-p}\begin{bmatrix} 1 & 0 \\ 0 & 1 \end{bmatrix}, K_1 = \sqrt{p}\begin{bmatrix} 1 & 0 \\ 0 & -1 \end{bmatrix}$$

Depolarization:

$$K_0 = \sqrt{1-p}\begin{bmatrix} 1 & 0 \\ 0 & 1 \end{bmatrix}, K_1 = \sqrt{p/3}\begin{bmatrix} 1 & 0 \\ 0 & -1 \end{bmatrix}$$

$$K_2 = \sqrt{p/3}\begin{bmatrix} 0 & 1 \\ 1 & 0 \end{bmatrix}, K_3 = \sqrt{p/3}\begin{bmatrix} 0 & -i \\ i & 0 \end{bmatrix}$$

Amplitude Damping:

$$K_0 = \sqrt{1-p}\begin{bmatrix} 1 & 0 \\ 0 & \sqrt{1-\gamma} \end{bmatrix}, K_1 = \begin{bmatrix} 0 & \sqrt{\gamma(1-p)} \\ 0 & 0 \end{bmatrix}$$

$$K_2 = \sqrt{p}\begin{bmatrix} \sqrt{1-\gamma} & 0 \\ 0 & 1 \end{bmatrix}, K_3 = \begin{bmatrix} 0 & 0 \\ \sqrt{\gamma p} & 0 \end{bmatrix}$$

Figure 7:
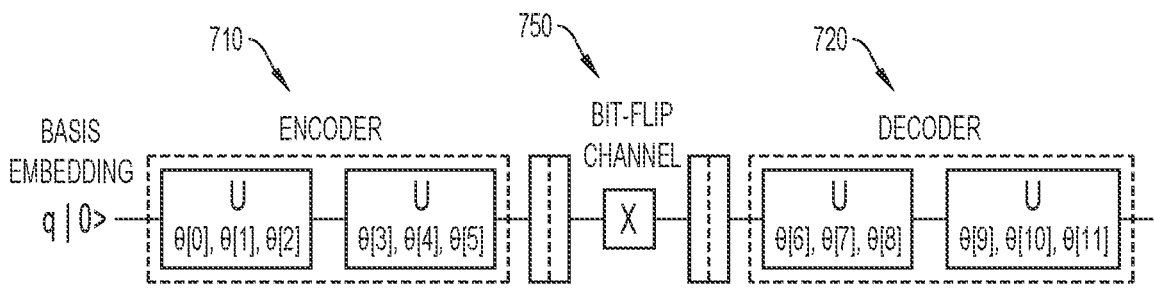
FIG. 7 shows an example of parameters used by the encoder and the decoder in a bit-flip channel scenario, according to an example embodiment.

FIG. 7 shows an example of parameters used by the encoder and the decoder in a bit-flip channel scenario, according to an example embodiment. In this model, two encoding and decoding passes (U) are implemented, respectively, in encoder 710 and decoder 720, with, in this case, bit-flip channel 750 therebetween. As shown, a qubit undergoes basis embedding (q|0) and is then acted upon, in encoder 710, by codes generated by ML quantum coding logic 200, which is also configured to generate decoding codes for decoder 720.

In sum, disclosed herein is a framework for training quantum channel codes and using such codes for encoded communication across a channel. Analysis has shown its effectiveness in learning capacity-achieving codes for qubit channels in both classical and EA classical capacities. The framework can be extended to explore other quantum channel capacities, such as the quantum capacity, and can be adapted for multiple input-output channels. Moreover, testing various pooling strategies can lead to efficient joint-detection receiver (JDR) designs.

FIG. 8 is a flowchart illustrating a series of operations executed by ML quantum coding logic 200, according to an example embodiment. At 810, an operation is configured to generate a first set of quantum channel codes configured to encode a message to obtain a quantum encoded message. At 812, an operation is configured to supply the first set of quantum channel codes to an encoder. At 814, an operation is configured to generate a second set of quantum channel codes configured to decode the quantum encoded message. And at 816, an operation is configured to supply the second set of quantum channel codes to a decoder that is configured to operate with the encoder across a channel, wherein the first set of quantum channel codes and the second set of quantum channel codes are derived using a machine learning model.

Figure 9:
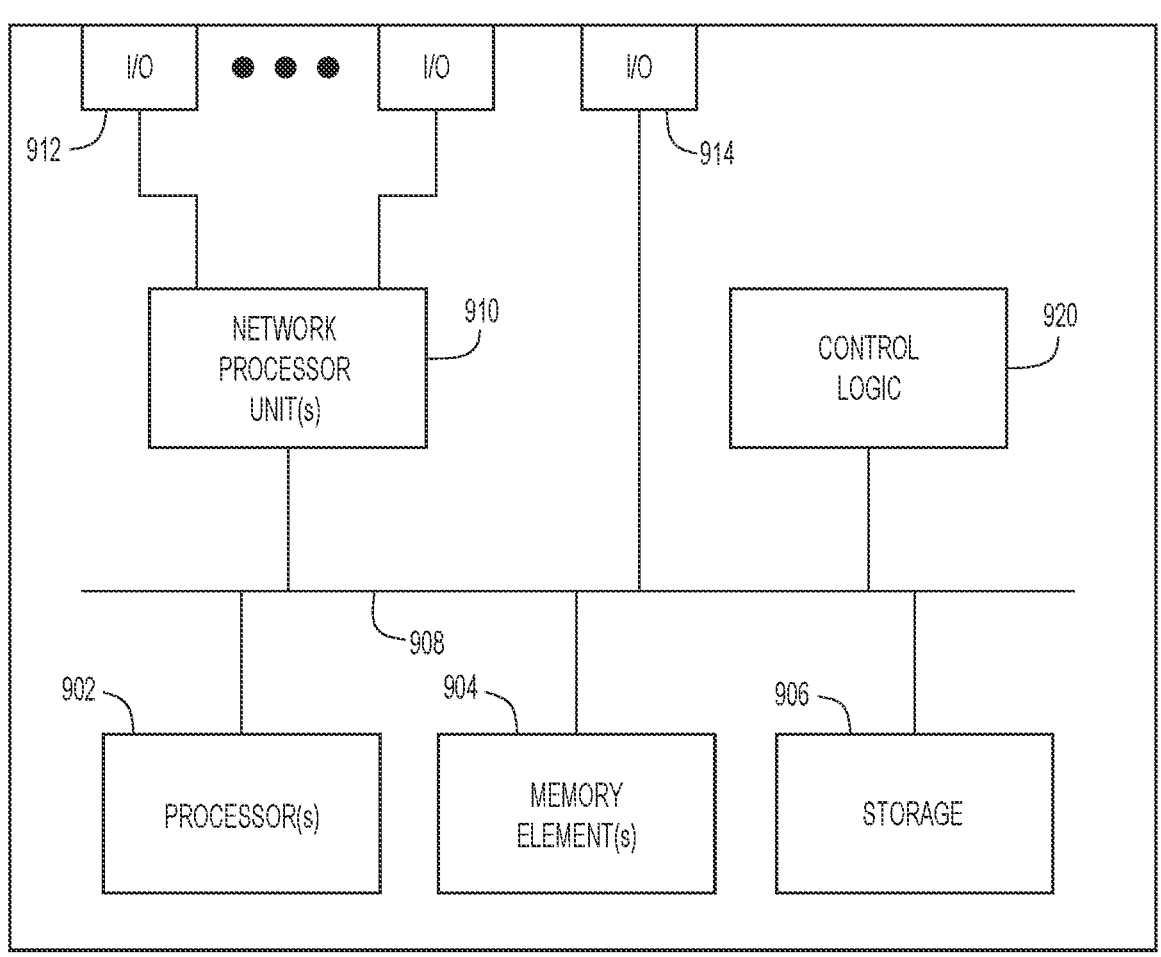
FIG. 9 is a block diagram of a computing device that may be configured to execute image sensitivity detection and control logic and perform the techniques described herein, according to an example embodiment.

FIG. 9 is a block diagram of a computing device that may be configured to execute ML quantum coding logic 200 (as well as encoder 110 and/or decoder 120) and perform the techniques described herein, according to an example embodiment. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920 (which could include, for example, ML quantum coding logic 200). In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations, and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa) or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data, and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/ antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read-only memory (EPROM), application-specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer-readable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software-defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications, including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used, such as electric, sound, light, infrared, and/or radio, to facilitate communications through one or more networks in accordance with embodiments herein. Communications, interactions, operations, etc., as discussed for various embodiments described herein, may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc., which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores, or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like, as used herein in this Specification, can be inclusive of an executable file comprising instructions that can be understood and processed on a server, computer, processor, machine, compute node, combinations thereof, or the like, and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, a method may include generating a first set of quantum channel codes configured to encode a message to obtain a quantum encoded message, supplying the first set of quantum channel codes to an encoder, generating a second set of quantum channel codes configured to decode the quantum encoded message, and supplying the second set of quantum channel codes to a decoder that is configured to operate with the encoder across a channel, wherein the first set of quantum channel codes and the second set of quantum channel codes are derived using a machine learning model.

In the method, the first set of quantum channel codes and the second set of quantum channel codes are different from each other.

The method may further include training the machine learning model based on a cross-entropy loss calculation.

In the method, the channel may behave as at least one of a bit-flip channel, a depolarization channel, or a $\rho=1$ amplitude damping channel.

In the method, the decoder may be configured to employ entanglement-assisted communication decoding techniques.

In the method, the channel may behave as at least one of a phase-flip channel, a depolarization channel, or a $\rho=\frac{1}{2}$ amplitude damping channel.

In the method, the decoder may operate as a joint-detection receiver.

In the method, the decoder may be configured to decode the quantum encoded message using a parameterized pooling circuit.

In the method, the first set of quantum channel codes may include at least one set of three parameters representative of an arbitrary rotation.

In the method, the second set of quantum channel codes may include at least one set of three parameters representative of an arbitrary rotation.

In another embodiment, a device may be provided and may include an interface configured to enable network communications, a memory, and one or more processors coupled to the interface and the memory, and configured to: generate a first set of quantum channel codes configured to encode a message to obtain a quantum encoded message, supply the first set of quantum channel codes to an encoder, generate a second set of quantum channel codes configured to decode the quantum encoded message, and supply the second set of quantum channel codes to a decoder that is configured to operate with the encoder across a channel, wherein the first set of quantum channel codes and the second set of quantum channel codes are derived using a machine learning model.

In the device, the first set of quantum channel codes and the second set of quantum channel codes may be different from each other.

In the device, the one or more processors may be configured to train the machine learning model based on a cross-entropy loss calculation.

In the device, the channel may behave as at least one of a bit-flip channel, a depolarization channel, or a $\rho=1$ amplitude damping channel.

In the device, the decoder may be configured to employ entanglement-assisted communication decoding techniques.

In the device, the channel may behave as at least one of a phase-flip channel, a depolarization channel, or a $\rho=\frac{1}{2}$ amplitude damping channel.

In the device, the decoder may operate as a joint-detection receiver.

In yet another embodiment, one or more non-transitory computer readable storage media encoded with instructions are provided and that, when executed by a processor, cause the processor to: generate a first set of quantum channel codes configured to encode a message to obtain a quantum encoded message, supply the first set of quantum channel codes to an encoder, generate a second set of quantum channel codes configured to decode the quantum encoded message, and supply the second set of quantum channel codes to a decoder that is configured to operate with the encoder across a channel, wherein the first set of quantum channel codes and the second set of quantum channel codes are derived using a machine learning model.

In the one or more non-transitory computer readable storage media, the first set of quantum channel codes and the second set of quantum channel codes may be different from each other.

In the one or more non-transitory computer readable storage media, the decoder may be configured to employ entanglement-assisted communication decoding techniques.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:
generating a first set of quantum channel codes configured to encode a message comprising at least one qubit to obtain a quantum encoded message;
supplying the first set of quantum channel codes to an encoder;

generating a second set of quantum channel codes configured to decode the quantum encoded message; and
supplying the second set of quantum channel codes to a decoder that is configured to operate with the encoder across a channel,
wherein the first set of quantum channel codes and the second set of quantum channel codes are derived using a machine learning model, and
wherein the first set of quantum channel codes comprises two subsets of quantum channel codes for two encoding passes, and the second set of quantum channel codes comprises two subsets of quantum channel codes for two decoding passes.

2. The method of claim 1, wherein the first set of quantum channel codes and the second set of quantum channel codes are different from each other.

3. The method of claim 1, further comprising training the machine learning model based on a cross-entropy loss calculation.

4. The method of claim 1, wherein the channel behaves as at least one of a bit-flip channel, a depolarization channel, or a $\rho=1$ amplitude damping channel.

5. The method of claim 1, wherein the decoder is configured to employ entanglement-assisted communication decoding techniques.

6. The method of claim 5, wherein the channel behaves as at least one of a phase-flip channel, a depolarization channel, or a $\rho=\frac{1}{2}$ amplitude damping channel.

7. The method of claim 1, wherein the decoder operates as a joint-detection receiver.

8. The method of claim 1, wherein the decoder is configured to decode the quantum encoded message using a parameterized pooling circuit.

9. The method of claim 1, wherein the first set of quantum channel codes comprises at least one set of three parameters representative of an arbitrary rotation.

10. The method of claim 1, wherein the second set of quantum channel codes comprises at least one set of three parameters representative of an arbitrary rotation.

11. A device comprising:
an interface configured to enable network communications;
a memory; and
one or more processors coupled to the interface and the memory, and configured to:
generate a first set of quantum channel codes configured to encode a message comprising at least one qubit to obtain a quantum encoded message;
supply the first set of quantum channel codes to an encoder;
generate a second set of quantum channel codes configured to decode the quantum encoded message; and
supply the second set of quantum channel codes to a decoder that is configured to operate with the encoder across a channel,
wherein the first set of quantum channel codes and the second set of quantum channel codes are derived using a machine learning model, and
wherein the first set of quantum channel codes comprises two subsets of quantum channel codes for two encoding passes, and the second set of quantum channel codes comprises two subsets of quantum channel codes for two decoding passes.

12. The device of claim 11, wherein the first set of quantum channel codes and the second set of quantum channel codes are different from each other.

13. The device of claim 11, wherein the one or more processors are configured to train the machine learning model based on a cross-entropy loss calculation.

14. The device of claim 11, wherein the channel behaves as at least one of a bit-flip channel, a depolarization channel, or a $\rho=1$ amplitude damping channel.

15. The device of claim 11, wherein the decoder is configured to employ entanglement-assisted communication decoding techniques.

16. The device of claim 15, wherein the channel behaves as at least one of a phase-flip channel, a depolarization channel, or a $\rho=\frac{1}{2}$ amplitude damping channel.

17. The device of claim 11, wherein the encoder and the decoder operate as a joint-detection receiver.

18. One or more non-transitory computer readable storage media encoded with instructions that, when executed by a processor, cause the processor to:

generate a first set of quantum channel codes configured to encode a message comprising at least one qubit to obtain a quantum encoded message;

supply the first set of quantum channel codes to an encoder;

generate a second set of quantum channel codes configured to decode the quantum encoded message; and supply the second set of quantum channel codes to a decoder that is configured to operate with the encoder across a channel, wherein the first set of quantum channel codes and the second set of quantum channel codes are derived using a machine learning model, and wherein the first set of quantum channel codes comprises two subsets of quantum channel codes for two encoding passes, and the second set of quantum channel codes comprises two subsets of quantum channel codes for two decoding passes.

19. The one or more non-transitory computer readable storage media of claim 18, wherein the first set of quantum channel codes and the second set of quantum channel codes are different from each other.

20. The one or more non-transitory computer readable storage media of claim 18, wherein the decoder is configured to employ entanglement-assisted communication decoding techniques.

\* \* \* \* \*